UNITED STATES PATENT OFFICE.

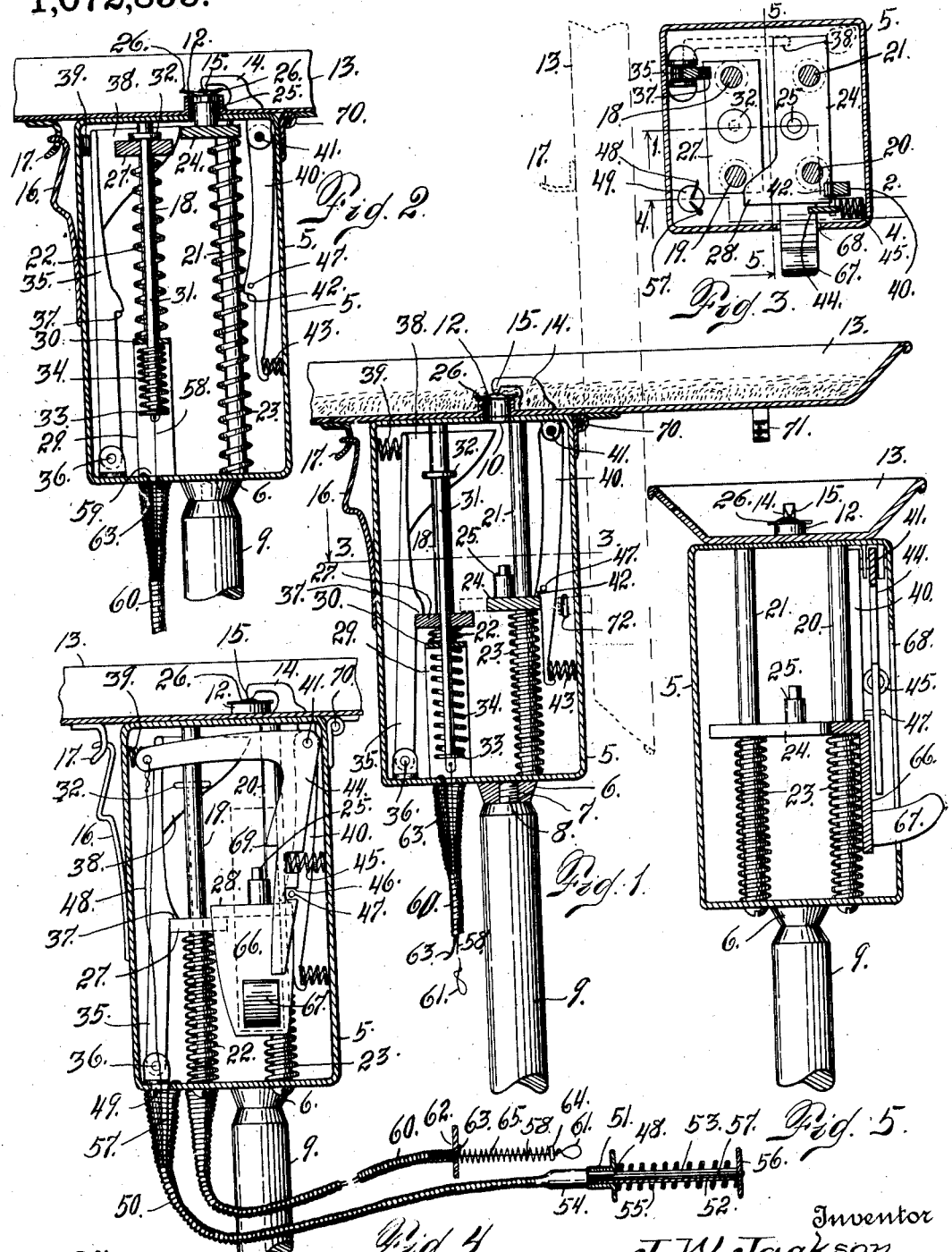

JOHN W. JACKSON, OF DENVER, COLORADO.

FLASH-LIGHT APPARATUS.

1,072,853.  Specification of Letters Patent.  Patented Sept. 9, 1913.

Application filed March 6, 1913. Serial No. 752,293.

*To all whom it may concern:*

Be it known that I, JOHN W. JACKSON, a citizen of the United States, residing in the city and county of Denver and State of Colorado, have invented certain new and useful Improvements in Flash-Light Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in flash light apparatus and consists broadly in means for firing a flash light powder and operating the shutter of a camera.

One of the objects of the invention is the provision of an apparatus which may be set to operate at some future time upon the occurrence of a predetermined event, such for instance, as the passing of an animal. My apparatus may be set and left for any length of time and if an animal has passed, and in doing so pulled a string or operated some other form of tripping mechanism either in the day time or at night, an equally good exposure will be made by the camera in either instance.

Another object of the invention is to so arrange the flash firing and shutter operating mechanism that they may be released by a common means.

A further object is to provide for the operation of the shutter at the instant that the flash has reached its maximum of intensity, that is, to provide for a small interval of time between the discharge of the percussion cap or the operation of other suitable flash firing means and the throwing of the shutter.

Still another object is to provide means for setting the flash firing and shutter operating means by the movement of a single thumb piece or projection.

Another object is the construction of the apparatus in such a way that the powder trough may be folded into a convenient position for transportation.

Other objects will appear hereinafter as I proceed with the description of that embodiment of the invention, which for the purposes of the present application, I have illustrated in the accompanying drawing, in which:

Figure 1 is a vertical sectional view taken approximately upon the line 1—2, Fig. 3. Fig. 2 is a view similar to Fig. 1, but showing the mechanism in the position which it occupies at the time the exposure is being made. Fig. 3 is a cross sectional horizontal view taken upon the line 3—3, Fig. 1. Fig. 4 is a vertical section taken upon the line 4—4, Fig. 3. Fig. 5 is a vertical section taken upon the line 5—5, Fig. 3.

The same reference characters refer to like parts throughout the views.

In the drawing, which forms a part of this specification, 5 refers to a rectangular casing provided upon its lower surface with a projection 6, having therein a threaded socket 7, which is adapted to receive a threaded projection 8 upon a support 9 which in the drawing, I have illustrated as a single post, but which may be of any suitable character as, for instance, a tripod of the ordinary construction.

In the top wall of the receptacle 5 is an opening 10 which registers with a short tubular member 12 formed integral with the base of a trough 13, when the latter is in the full line position of Fig. 1. Secured upon the base of the trough 13 adjacent the tubular member 12 is a hard metal member 14 bearing at its outer extremity a pointed projection 15 which I shall hereinafter term a firing pin. The trough 13 is releasably held in its operative position by a spring catch 16, fastened to the receptacle 5 and having an upper angular extremity which projects through a suitable opening in a bracket 17 depending from the bottom of the trough.

Within the receptacle 5 are four vertical rods, 18, 19, 20 and 21, the ends of which are firmly secured by any desired means in the upper and lower walls of the receptacle. Coil springs 22 and 23 surround the lower portions of each of the vertical rods.

Slidable upon the rods 20 and 21 above the springs 23 is a plate 24 which carries a hammer 25 having a reduced upper portion adapted to impinge against a percussion cap 26, the latter being placed upon the top of the tubular member 12. A plate 27 is slidable upon the rods 18 and 19 above the springs 22, the plate 27 being overhung by a projection 28 upon the plate 24. Arranged intermediate the rods 18 and 19 is a flat bar 29 having a horizontally bent portion 30, at its upper extremity, the bar 29 being anchored to the bottom of the receptacle 5. Through an opening in the horizontal portion 30 a small rod 31 is arranged to slide loosely. The plate 27 is also provided with an opening to loosely receive the rod 31. The latter merges at its upper extremity into a flat disk 32 while near its lower extremity it carries another flat disk 33 which acts as one abutment for a coil spring 34, the horizontal portion 30 of the bar 29 constituting the opposite abutment.

A trigger 35 pivoted in a bracket 36 has a shoulder 37 to act as a detent for the plate 27 when the latter is in the retracted position illustrated in Figs. 1 and 4. At its upper end the trigger 35 has a cam 38 which normally projects into the path of the plate 24 as the latter rises. A trigger 40 pivoted to a bracket 41 depending from the upper wall of the receptacle 5 has a shoulder 42 for engagement with the plate 24 when the latter is in the position illustrated in Figs. 1 and 4, the trigger 40 being normally held in the operative position by a coil spring 43. Also pivoted in the bracket 41 is a bell crank lever 44, the vertical member of which is normally held outwardly from the wall of the receptacle 5 by means of a spring 45. In one edge of the lever is a notch 46 arranged to receive a pin 47 upon the trigger 40.

To the outer extremity of the horizontal arm of the lever 44 is attached a wire or other flexible connection 48 which passes down through an opening 49 in the base of the receptacle 5 and through a coiled wire tube 50 to a sleeve 51 which is slidable upon a hollow rod 52, the latter having a longitudinal slot 53 therein through which the wire 48 passes before being secured to the sleeve 51. The hollow rod 52 is secured to or integral with the hollow tubular member 54 constituting the end of the tube 50.

A coiled spring 55 is interposed between the sleeve 51 and a plate 56 upon the outer extremity of the hollow rod 52, the function of the spring 55 being to return the sleeve 51 to normal position after being operated. A wire 57 extends through the tube 50 being attached to the receptacle 5 and to the plate 56 at its opposite ends, thus serving to hold together the coils of the tube 50.

The lower end of the rod 31 has attached thereto a wire 58 which extends downwardly through an opening 59 in the receptacle and through a tube 60 similar in construction to the tube 50. At its opposite end, this wire 58 is formed into a loop 61 for attachment to the operating lever of a camera shutter. At its outer extremity the tube 60 has a hollow flanged member 62 to which is attached one end of a wire 63, the opposite end being secured to the base of the receptacle 5. The wire 63 corresponds to the wire 57 of the tube 50 and has a similar function. Near the outer end of the wire 58 is secured a small disk or plate 64 between which and the member 62 is a spring 65 for maintaining the loop 61 in its normal position.

The plate 24 is provided upon one end with a depending apron 66 which carries a thumb piece 67 projecting through a slot 68 in the front wall of the receptacle 5. A shoulder 69 upon the bell crank lever 44 is adapted to engage the thumb piece 67 and retain the hammer in what I term, "the half cocked position."

When the apparatus is to be moved about from one place to another, I turn the powder trough upon its hinge 70 to the broken line position of Fig. 1, the catch 16 having first been retracted from engagement with the bracket 17. In the folded position, a spring finger 71 automatically engages a small boss 72 by means of which the folded position of the trough is maintained.

From the foregoing disclosure, the operation of my improved apparatus may be readily understood.

A camera is set up and focused for the desired picture. My flash light apparatus is then set up near the camera and the loop 61 is placed upon the shutter operating lever, some suitable device being arranged for pulling the sleeve 51 outwardly upon the hollow rod 52 at the desired moment of exposure. A charge of flash light powder is placed in the trough 13 and the thumb piece 67 is pushed downwardly until the triggers 35 and 40 lock the sliding plates 24 and 27 in the retracted position. An outward movement of the sleeve 51 causes the wire 48 to pull the horizontal arm of the bell crank lever 44 downwardly swinging the vertical arm of the lever toward the right (Fig. 4). The lever carries with it the pin 47 upon the trigger 40, thus swinging the trigger and when the shoulder 42 has been retracted from the plate 24 the springs 23 thrust the plate 24 upward suddenly, causing the hammer 25 to strike against the firing pin 15 and discharge the percussion cap 26. The latter fires the flash powder in the trough. As the plate 24 rises its rear extremity engages the cam 38 of the trigger 35, swinging the latter toward the left and into the position of Fig. 2, thereby withdrawing the shoulder 37 from contact with the plate 27 permitting the latter to rise under the influence of the springs 22. When the plate 27 strikes the disk 32 upon the upper end of the small rod 31, it carries the latter rod upwardly against the tension of the spring 34, thus pulling upon the wire 58 and operating the shutter of the camera.

The operation of the shutter of the camera, is almost simultaneous with the firing of the flash light powder, but it will be evident that a very small interval of time elapses after the discharge of the percussion cap before the shutter is thrown. This is for the purpose of permitting the flash to reach its greatest intensity before the exposure is made.

It is obvious that minor changes in the details of construction may be made without departing from the spirit of my invention as set forth in the appended claims.

I claim:

1. In a device for firing flash powder and for operating the shutter of a camera, a spring impelled hammer, a trigger for retaining said hammer in the retracted position, a spring impelled element adapted to be connected to the shutter of a camera, a trigger for retaining said element in the retracted position, a cam surface upon said last named trigger, means for retracting the first named trigger, and a projection upon the hammer adapted to engage said cam surface to operate the second named trigger.

2. In a device of the class described, a spring impelled hammer, spring impelled mechanism connected with the shutter of a camera, a thumb piece attached to said hammer for convenience in retracting the latter and a projection upon the hammer for engagement with a portion of said mechanism whereby retraction of the hammer will cause a corresponding retraction of the aforesaid portion of said mechanism.

3. In a device of the class described, a spring impelled hammer, an element connected to the shutter of the camera, a spring impelled plate for moving said element, a thumb piece attached to said hammer for convenience in retracting the latter and a projection upon the hammer for engagement with the said plate whereby retraction of the hammer will cause retraction of the plate.

4. In a device of the class described, a rectangular receptacle, hammer mechanism within said receptacle, a powder trough hinged to one side of said receptacle adjacent its upper surface, said receptacle and trough having openings alining when the trough is folded onto the top surface of the receptacle and means for releasably retaining said trough in position against the top or side surfaces of the receptacle.

5. In a device of the class described, two spiral springs arranged parallel to each other, a hammer mounted to be acted upon by one of said springs, a shutter operating element adapted to be acted upon by the other of said springs, a trigger for retaining said element in its retracted position and means adapted to be operated by the throwing of said hammer for pulling said trigger.

In testimony whereof I affix my signature in presence of two witnesses.

JOHN W. JACKSON.

Witnesses:
SOLON J. BOUGHTON,
OTTO E. HODDICK.